(12) United States Patent
Paczkowski et al.

(10) Patent No.: US 11,615,204 B1
(45) Date of Patent: Mar. 28, 2023

(54) USE OF SEMANTICALLY SEGMENTED FILENAMES

(71) Applicant: T-MOBILE INNOVATIONS LLC, Overland Park, KS (US)

(72) Inventors: Lyle W. Paczkowski, Mission Hills, KS (US); William M. Parsel, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 244 days.

(21) Appl. No.: 16/789,008

(22) Filed: Feb. 12, 2020

(51) Int. Cl.
*G06F 21/62* (2013.01)
*G06F 16/23* (2019.01)
*G06F 16/22* (2019.01)

(52) U.S. Cl.
CPC ...... *G06F 21/6245* (2013.01); *G06F 16/2255* (2019.01); *G06F 16/2365* (2019.01); *G06F 2221/2141* (2013.01)

(58) Field of Classification Search
CPC ............. G06F 21/6245; G06F 16/2255; G06F 16/2365; G06F 2221/2141
See application file for complete search history.

(56) References Cited

U.S. PATENT DOCUMENTS

| | | | |
|---|---|---|---|
| 11,456,893 B1 | 9/2022 | Paczkowski et al. | |
| 2004/0215963 A1* | 10/2004 | Kaplan | G07F 7/122 713/172 |
| 2005/0138110 A1* | 6/2005 | Redlich | G06F 21/6254 709/201 |
| 2011/0231660 A1 | 9/2011 | Kanungo | |
| 2013/0080516 A1 | 3/2013 | Bologh | |
| 2020/0008067 A1 | 1/2020 | Filsfils et al. | |
| 2021/0218754 A1* | 7/2021 | Zou | G06F 17/16 |

OTHER PUBLICATIONS

Office Action dated Jan. 25, 2022, U.S. Appl. No. 17/031,748, filed Sep. 24, 2020.
Paczkowski, Lyle W., et al., "VNF Slice Portability," filed Sep. 24, 2020, U.S. Appl. No. 17/031,748.
Notice of Allowance dated May 27, 2022, U.S. Appl. No. 17/031,748, filed Sep. 24, 2020.

* cited by examiner

*Primary Examiner* — Ashokkumar B Patel
*Assistant Examiner* — William B Jones

(57) ABSTRACT

A method of validating the contents of an electronic file. The method comprises requesting an electronic file by an application executing on a computer system by providing a multi-segment filename, wherein the multi-segment filename comprises a unique delimiter between each of the segments of the multi-segment filename and one of the segments of the multi-segment filename is a hash of a content of the electronic file referenced by the multi-segment filename, receiving by the application the electronic file referenced by the multi-segment filename, determining a hash over the content of the electronic file by the application, comparing by the application the hash determined by the application to the hash of the content stored in the one of the segments of the multi-segment filename, and, based on the two hashes agreeing, opening by the application the contents of the electronic file for use.

14 Claims, 6 Drawing Sheets

USE OF SEMANTICALLY SEGMENTED FILENAMES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data may be organized for computer processing into files. Files may comprise data and metadata that is formatted in a distinctive format associated with a file type of a file. Sometimes filenames comprise an extension (similar to a surname) that corresponds with and/or identifies the format or file type of the file. Filenames desirably are unique within domains, for example within a file directory. Filename lengths may be limited to a maximum number of characters, for example limited to 255 characters exclusive of an extension.

SUMMARY

In an embodiment, a method of validating the contents of an electronic file is disclosed. The method comprises requesting an electronic file by an application executing on a computer system by providing a multi-segment filename, wherein the multi-segment filename comprises a unique delimiter between each of the segments of the multi-segment filename and one of the segments of the multi-segment filename is a hash of a content of the electronic file referenced by the multi-segment filename. The method further comprises receiving by the application the electronic file referenced by the multi-segment filename, determining a hash over the content of the electronic file by the application, comparing by the application the hash determined by the application to the hash of the content stored in the one of the segments of the multi-segment filename, and, based on the two hashes agreeing, opening by the application the contents of the electronic file for use.

In another embodiment, a method of managing multi-privilege layer access to confidential information imbedded in filenames of electronic files is disclosed. The method comprises receiving a multi-segment filename of an electronic file by an application executing on a computer system, wherein the multi-segment filename comprises a unique delimiter between each of the segments of the multi-segment filename and one of the segments of the multi-segment filename comprises a first encrypted data word encrypted with a first encryption key and generating a first decrypted data word by the application by decrypting the first encrypted data word using the first encryption key, where the first decrypted data word comprises first clear text data and a second encrypted data word encrypted with a second encryption key. The method further comprises generating a second decrypted data word by the application by decrypting the second encrypted data word using the second encryption key, where the second decrypted data word comprises second clear text data, providing the first clear text data by the application to a first user having a first access privilege level, and providing the first clear text data and the second clear text data by the application to a second user having a second access privilege level, wherein the second access privilege level is higher than the first access privilege level.

In yet another embodiment, a method of executing an electronic file is disclosed. The method comprises receiving a request to access an electronic file where the request comprises a first filename of the electronic file in a multi-segment filename format by an application executing on a computer system, wherein the multi-segment filename format imbeds a location of the electronic file, imbeds ownership of the electronic file, imbeds a second filename in a filename format different from the multi-segment filename format, and comprises at least some of a data content of the electronic file identified by the first filename. The method further comprises parsing the first filename by the application to determine the ownership of the electronic file, determining that a requestor of the electronic file matches the ownership of the electronic file, accessing the electronic file by the application at the location imbedded in the first filename based on providing the first filename, and providing the electronic file to the requestor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
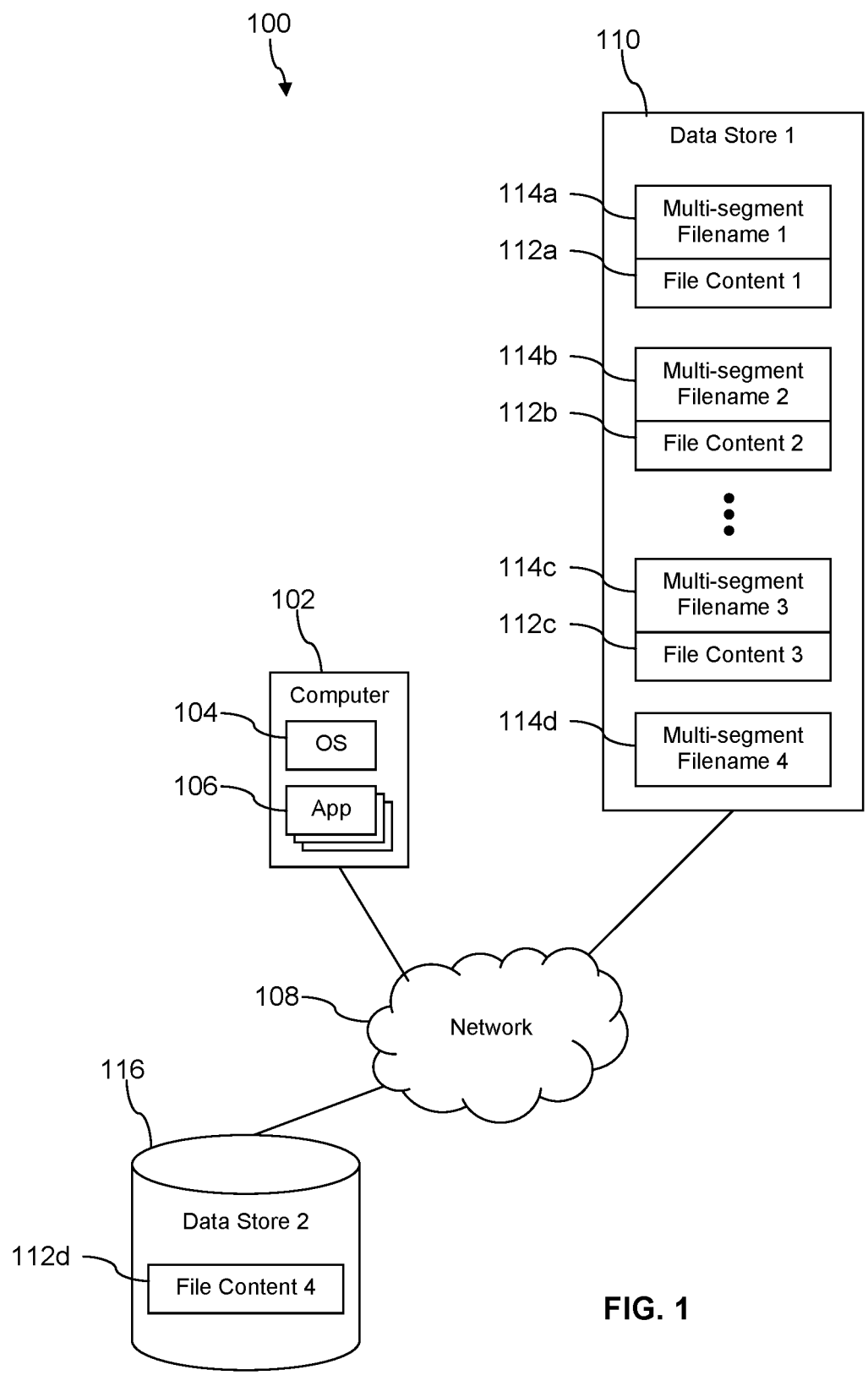
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Filenames typically are simple identities. The present disclosure teaches creating a semantic filename structure that continues to serve as an identity for a corresponding file but that encapsulates additional information in the filename that may be used by computers to provide new kinds of processing of files. The semantic filename comprises a plurality of fields each of which may comprise up to a maximum number of characters. The semantic filename may also be referred to as a multi-segment filename. The fields or segments of the filename are delimited from each other by a distinctive delimiter, for example delimited by double dots. It is contemplated that the semantic filename may comprise three fields, four fields, five fields, or some other number of fields. An example three field filename is: abcd..efgh..ijkl, where the first field abcd is separated from the second field efgh by two dots, and the second field efgh is separated from the third field ijkl by two dots. The different fields may contain different kinds of information.

One of the fields of the semantic filename structure may comprise a hash of the contents of the file. A user of a file may calculate a hash over the contents and compare the calculated hash to the hash embedded in the semantic filename to determine if the file has been corrupted. In an embodiment, the hash may be stored in encrypted form, such that an unqualified user or entity could not tamper with the contents of the file and cover his or her tracks by regenerating the hash of the content and substituting the regenerated hash for the original hash. This kind of validation of file content may be performed by an operating system of a computer that mediates access to and/or use of the file. This kind of validation of file content may be performed by an application that requests the file before using the file in processing. By validating the content of the file using the hash embedded in the multi-partition filename before using the content of the file, wasted processing time may be avoided and execution of malware may be avoided.

One of the fields of the semantic filename structure may comprise encrypted information that is provided selectively to users based on a privilege level associated with the users. For example, decrypting a first encrypted portion of a field or segment may produce a first clear text data accessible to a low privilege level, a medium privilege level, and a high privilege level and also produce a second encrypted portion. Decrypting the second encrypted portion may produce a second clear text data accessible to a medium privilege level and a high privilege level and also produce a third encrypted portion. Decrypting the third encrypted portion may produce a third clear text data accessible to a high privilege level. An operating system of a computer that mediates access to and/or use of the file may restrict access to the clear text data based on the privilege level associated with a user and/or an application. The encrypted data may be privileged data that should not be revealed indiscriminately. For example, the data may comprise personally identifiable information and/or health information. In an embodiment, the multi-segment filename may comprise data from the file referenced or identified by the multi-segment filename. The data may comprise metadata about the file, for example data that indicates a structure or organization of the file.

An application that processes a multi-segment filename having encrypted information in the filename may be able to decrypt some but not all of the encrypted information, based on a privilege level associated with the application. For example, a first application having a low privilege level may only be able to decrypt the first encrypted portion and use that decrypted information, and not be able to decrypt the second and third encrypted portions of the filename. A second application having a medium privilege level may be able to decrypt the first and second encrypted portions and use that decrypted information, but not be able to decrypt the third encrypted portion of the filename. A third application having a high privilege level may be able to decrypt the first, second, and third encrypted portions of the filename and use that decrypted information.

In an embodiment, the first decrypted portion provides a first access token to access a first portion of the content but not all of the content of the file identified by the filename. The second decrypted portion provides a second access token to access a second portion of the content but not the remainder of the file identified by the filename. The third decrypted portion provides a third access token to access a third portion of the content but not the remainder of the file identified by the filename. A user or application having a medium privilege level may access the first portion of the content based on the first access token and access the second portion of the content based on the second access token. A user or application having a high privilege level may access the first portion of the content based on the first access token, access the second portion of the content based on the second access token, and access the third portion of the content based on the third access token.

In an embodiment, the first decrypted portion, the second decrypted portion, and the third decrypted portion may be provided by a user or an application when executing the content of the file identified by the multi-segment filename (e.g., when the content of the file is an executable program or script), such that the execution of the instructions of the content is based on the different privilege levels. The user or application may provide the decrypted information or a portion of the decrypted information as parameters or arguments when executing the file. The instructions embedded in the executable program or script may select different execution paths based on different decrypted information or input parameters. Said in other words, users or applications executing the same file but providing different decrypted portions or tokens may cause different results of execution of the file.

One of the fields of the semantic filename structure may comprise an identification of an owner. One of the fields of the semantic filename structure may embed a location of the contents of the file, whereby the file may be retrieved for use based on the embedded information. The name of a owner of the file and/or the location of the contents of the file may be used, for example, in transferring execution of an executable file from a first execution environment to a second execution environment. This may occur, for example, when roaming from a first wireless communication service provider's network to a second wireless communication service provider's network. This may support, for example, moving a virtual network slice from a first execution environment to a second execution environment and/or from a first wireless communication service provider's network to a second wireless communication service provider's network. One of the fields of the semantic filename structure may embed a filename in a different file naming format, for example, a filename in a conventional filename format that only expresses or contains an identity of the file. Embedding a conventional filename in the semantic filename structure may allow the semantic filename to be processed, at least partially, by a legacy computing environment. Thus, an embedded conventional filename may make a semantic filename at least partially backwards compatible. The fields of the semantic filename structure may be referred to as segments and the semantic filename structure may be referred to as a multi-segment filename structure or format. In an embodiment, the semantic filename structure may identify a virtual network slice file, and the segments of the filename may identify an owner of the virtual network slice, identify what the virtual network slice is doing, and a location or computer system on which the virtual network slice was activated. In an embodiment, the filename may further identify a border controller engaged by the virtual network slice (the border controller operations of the virtual network slice pass through) and who is authorized to use the virtual network slice. In an embodiment, the filename may further identify a creation date of the virtual network slice and a time to live of the virtual network slice. In an embodiment, the filename may embed an identity of a home network associated with the virtual network slice, information about roaming options, and information about billing services provided by the virtual network slice.

Turning now to FIG. 1, a system 100 is described. In an embodiment, the system 100 comprises a computer 102 that comprises an operating system 104 and one or more applications 106 in communication with a network 108. The network 108 comprises one or more public networks, one or more private networks, or a combination thereof. The computer 102 may access a first data store 110, via the network 108, that comprises a plurality of files, each file identified by a multi-segment filename. For example, the first data store 110 comprises a first file 112a identified by a first multi-segment filename 114a, a second file 112b identified by a second multi-segment filename 114b, and a third file 112c identified by a third multi-segment filename 114c. A fourth file 112d may be stored in a second data store 116 while a fourth multi-segment filename 114d that identifies the fourth file 112d is stored in the first data store 110. Computers are described further hereinafter.

Figure 2A:
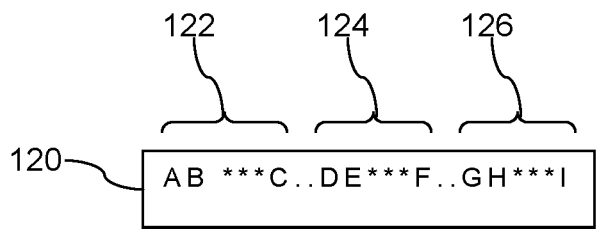
FIG. 2A is an illustration of a first multi-partition filename format according to an embodiment of the disclosure.
Figure 2B:
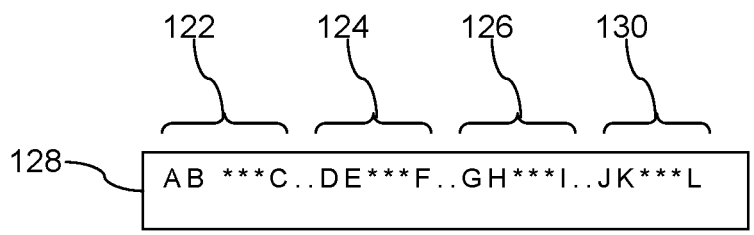
FIG. 2B is an illustration of a second multi-partition filename format according to an embodiment of the disclosure.
Figure 2C:
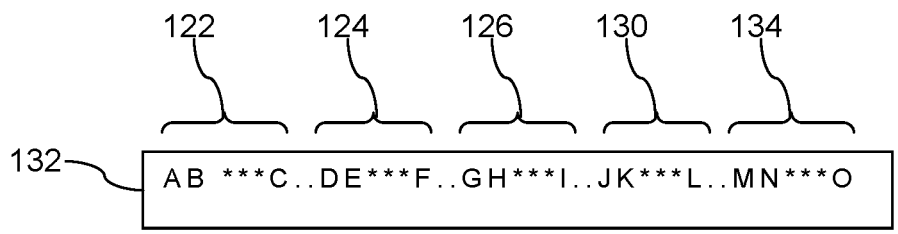
FIG. 2C is an illustration of a third multi-partition filename format according to an embodiment of the disclosure.

Turning now to FIG. 2A, a first multi-segment filename format 120 is described. The first multi-segment filename format 120 comprises a first field or segment 122, a second field or segment 124, and a third field or segment 126. In the first format 120, the first segment 122 is separated from the second segment 124 by two dots ('..'), and the second segment 124 is separated from the third segment 126 by two dots ('..'). Turning now to FIG. 2B, a second multi-segment filename format 128 is described. The second multi-segment filename format 128 comprises the first field or segment 122, the second field or segment 124, the third field or segment 126, and a fourth field or segment 130. In the second format 128, the first segment 122 is separated from the second segment 124 by two dots ('..'), the second segment 124 is separated from the third segment 126 by two dots ('..'), and the third segment 126 is separated from the fourth segment 130 by two dots ('..'). Turning now to FIG. 2C, a third multi-segment filename format 132 is described. The third multi-segment filename format 132 comprises the first field or segment 122, the second field or segment 124, the third field or segment 126, the fourth field or segment 130, and a fifth field or segment 134. In the third format 132, the first segment 122 is separated from the second segment 124 by two dots ('..'), the second segment 124 is separated from the third segment 126 by two dots ('..'), the third segment 126 is separated from the fourth segment 130 by two dots ('..'), and the fourth segment 130 is separated from the fifth segment 134 by two dots ('..'). It is understood that distinctive delimiters other than double dots ('..') may also be used in some embodiments to demark the separation of segments of the filename.

Each of the fields or segments 122, 124, 126, 130, 134 may comprise from one character up to a maximum number of characters. Different fields or segments 122, 124, 126, 130, 134 may be associated with a different maximum number of characters. For example, the first field or segment 122 may be associated with a maximum of 255 characters, and the second field or segment 124 may be associated with a maximum of 10,500 characters. Characters may be referred to as symbols in some context. Characters may be lowercase alphabetic characters, uppercase alphabetic characters, numerals, special characters such as exclamation mark (!), number sign (#), asterisk (*), or other special characters. Some characters may be deemed invalid in one or more of the fields or segments 122, 124, 126, 130, or 134. Characters may comprise American standard code for information interchange (ASII) characters. Characters may comprise extended binary coded decimal interchange code (EBCDIC) characters.

The multi-segment filenames 114 illustrated in FIG. 1 may be formatted in accordance with any of the multi-segment filename formats 120, 128, or 132. The multi-segment filenames 114 illustrated in FIG. 1 may not all be of the same multi-segment filename format 120, 128, or 132. For example, the first multi-segment filename 114a and the fourth multi-segment filename 114d may be formatted in accordance with the third multi-segment filename format 132, the second multi-segment filename 114b may be formatted in accordance with the first multi-segment filename format 120, and the third multi-segment filename 114c may be formatted in accordance with the second multi-segment filename format 128. While multi-segment filename formats having three segments, four segments, and five segments have been illustrated, it is contemplated that the teachings of the present disclosure may advantageously be used in multi-segment filename formats comprising two segments and comprising six or more segments.

With reference again to FIG. 1, an application 106 may request to access the first file 112a by providing the first multi-segment filename 114a to the operating system 104. The operating system 104 may parse the first multi-segment filename 114a to extract a hash embedded in one of the segments of the filename 114. The hash may be embedded in a first segment, a second segment, a third segment, a fourth segment, a fifth segment, or another segment of the first filename 114a. The operating system 104 may calculate a hash over the first file 112a and compare it to the hash parsed from or read from the first multi-segment filename 114a. If the calculated hash matches the parsed hash, the operating system 104 may provide the content of the first file 112a to the application 106. If the hashes do not match, the operating system 104 may not provide the content to the first file 112a to the application 106 and may provide, instead, an error message to the application 106 indicating the requested content of the first file 112a is corrupted or erroneous. In an embodiment, if the hashes do not match, the operating system 104 may send a file open error message to the requesting application 106. In an embodiment, the hash embedded in the first multi-segment filename 114a is encrypted, and the operating system 104 decrypts the encrypted hash before comparing to the hash it calculates over the first file 112a.

When the hash calculated does not match the hash embedded in the first multi-segment filename 114a, the operating system 104 may report the mismatch to a competent authority identified in the first multi-segment filename 114a. For example, the name and contact information (e.g., email or other reference) of an owner of the first file 112a may be embedded in one of the segments of the first multi-segment filename 114a. The owner of the first file 112a may respond to a notification by replacing the first file 112a in the first data store 110 with an uncorrupted file. While the validation of the first file 112a based on hashes was described above as being performed by the operating system 104, in an embodiment, the validation based on hashes may be performed by the application 106 that requests the first file 112a from the operating system 104 (or by making a system call to the operating system 104 to access the first file 112a).

In an embodiment, the application 106 may decrypt encrypted information embedded in the first multi-segment filename 114a to obtain data words associated with a low privilege level, associated with a medium privilege level, and/or a high privilege level. The application 106 may invoke the first file 112a for execution by the operating system 104 on the computer 102 (for example, when the first file 112a is an executable file) and provide one or more of the decrypted data words. The instructions of the first file 112a may perform different processing on behalf of the application 106 based on the privilege level associated with the one or more data words provided when it is invoked.

In an embodiment, the multi-segment filename 114 may embed a filename in a different filename format, for example in a conventional filename format. This embedded alternative filename format may be useful when interoperating with computer systems 102 and/or operating systems 104 that are not configured to work with the multi-segment filename format described herein.

In an embodiment, the multi-segment filename 114 may embed a name of an owner of the file 112 identified by the filename 114. The operating system 104 may restrict write-access to the file 112 to applications 106 which are not determined, by parsing the name of the owner from a segment of the filename 114, to be owners of the file 112 and only permit an application 106 that is determined to be the owner, by parsing the name of the owner from the segment of the filename 114, to write to the file 112.

Figure 3:
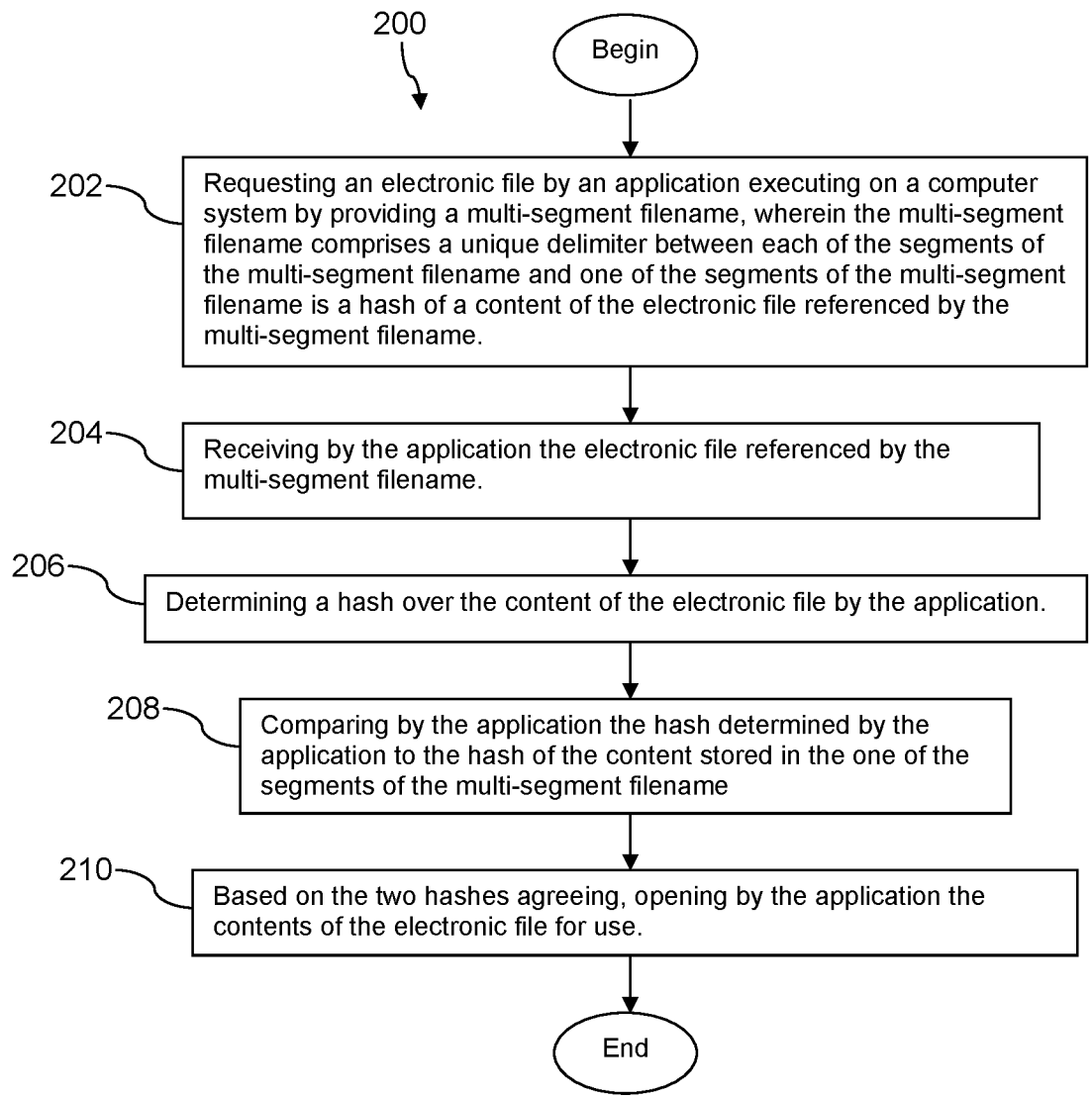
FIG. 3 is a flow chart of a method according to an embodiment of the disclosure.

Turning now to FIG. 3, a method 200 is described. In an embodiment, the method 200 comprises a method of validating the contents of an electronic file. At block 202, the method 200 comprises requesting an electronic file by an application executing on a computer system by providing a multi-segment filename, wherein the multi-segment filename comprises a unique delimiter between each of the segments of the multi-segment filename and one of the segments of the multi-segment filename is a hash of a content of the electronic file referenced by the multi-segment filename. In an embodiment, the application is an operating system of the computer system. In another embodiment, the application is a user application of the computer system. In another embodiment, the application is an application that is not part of the operating system of the computer system. In an embodiment, the multi-segment filename comprises at least three segments, for example three segments, four segments, five segments, or six segments. In an embodiment, the multi-segment filename comprises two segments. In an embodiment, the multi-segment filename embeds a filename having a different format that provides only file identity information and file type information, for example a filename having a short extension indicating the file type.

At block 204, the method 200 comprises receiving by the application the electronic file referenced by the multi-segment filename. At block 206, the method 200 comprises determining a hash over the content of the electronic file by the application. At block 208, the method 200 comprises comparing by the application the hash determined by the application to the hash of the content stored in the one of the segments of the multi-segment filename. At block 210, the method 200 comprises, based on the two hashes agreeing, opening by the application the contents of the electronic file for use. Under different facts, for example when a second electronic file is requested by providing a second multi-segment filename, if the calculated hash and the embedded hash (e.g., the hash stored in one of the segments of the second multi-segment filename) disagree, the application may propagate a file open error message to the requestor. Additionally, in this case of hash disagreement, the application may not open the contents of the electronic file.

Figure 4:
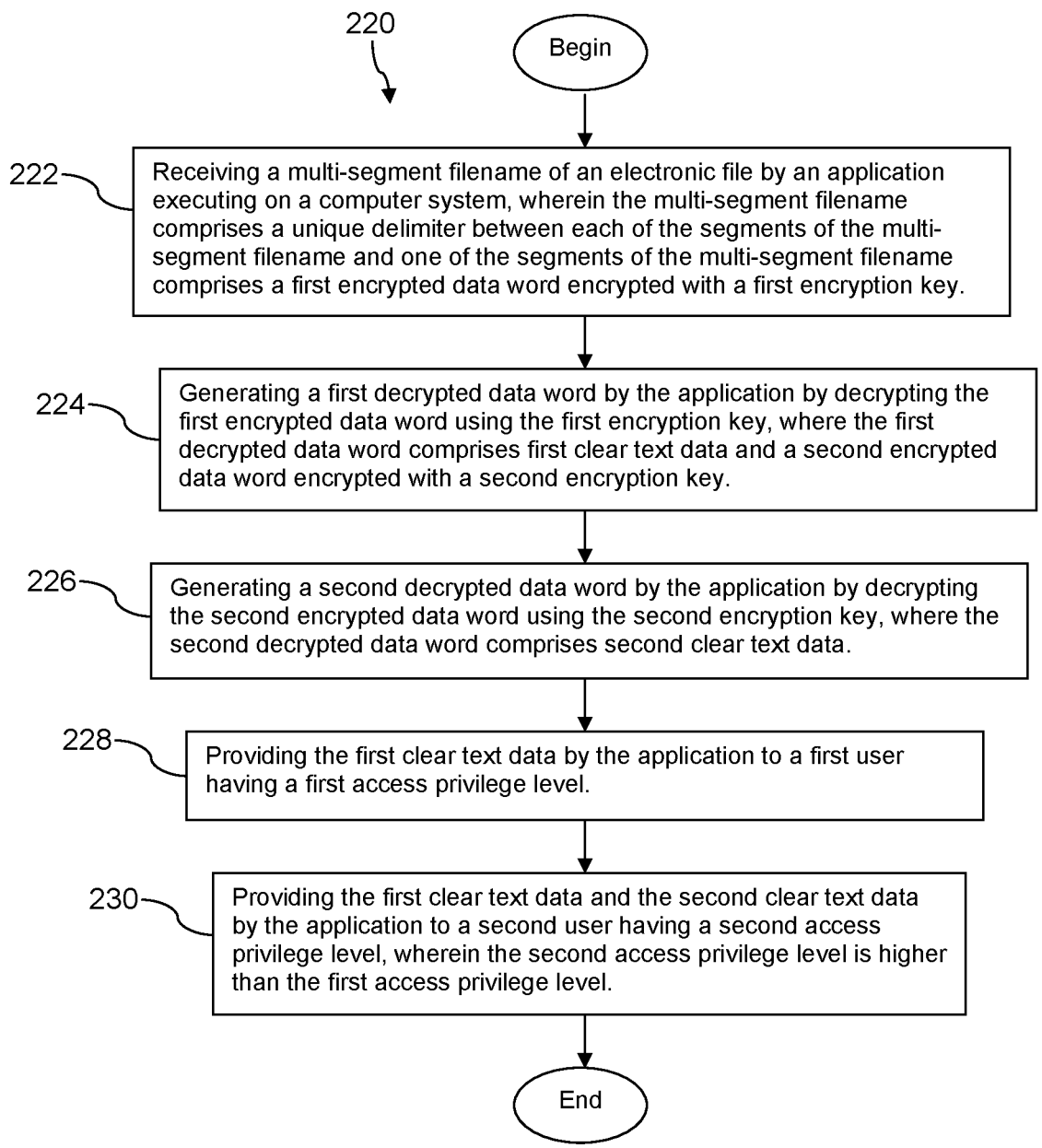
FIG. 4 is a flow chart of another method according to an embodiment of the disclosure.

Turning now to FIG. 4, a method 220 is described. In an embodiment, the method 200 is a method of managing multi-privilege layer access to confidential information imbedded in filenames of electronic files. At block 222, the method 200 comprises receiving a multi-segment filename of an electronic file by an application executing on a computer system, wherein the multi-segment filename comprises a unique delimiter between each of the segments of the multi-segment filename and one of the segments of the multi-segment filename comprises a first encrypted data word encrypted with a first encryption key. In an embodiment, the application is an operating system of the computer system. In another embodiment, the application is a user application of the computer system. In another embodiment, the application is an application that is not part of the operating system of the computer system. In an embodiment, the multi-segment filename comprises at least three segments, for example three segments, four segments, five segments, or six segments. In an embodiment, the multi-segment filename comprises two segments.

At block 224, the method 220 comprises generating a first decrypted data word by the application by decrypting the first encrypted data word using the first encryption key, where the first decrypted data word comprises first clear text data and a second encrypted data word encrypted with a second encryption key. At block 226, the method 220 comprises generating a second decrypted data word by the application by decrypting the second encrypted data word using the second encryption key, where the second decrypted data word comprises second clear text data. In an embodiment, the second clear text data is personal identifiable information (PII), banking information, or personal medical information.

At block 228, the method 220 comprises providing the first clear text data by the application to a first user having a first access privilege level. At block 230, the method 220 comprises providing the first clear text data and the second clear text data by the application to a second user having a second access privilege level, wherein the second access privilege level is higher than the first access privilege level.

In an embodiment, the method 220 further comprises receiving a request to execute a file identified by the multi-segment filename along with the first clear text data; and invoking the file identified by the multi-segment filename for execution on the computer system while providing the first clear text data as an execution parameter. In an embodiment, the method further comprises receiving a second request to execute the file identified by the multi-segment filename along with the second clear text data and invoking the file identified by the multi-segment filename for execution on the computer system while providing the second clear text data as an execution parameter.

Figure 5:
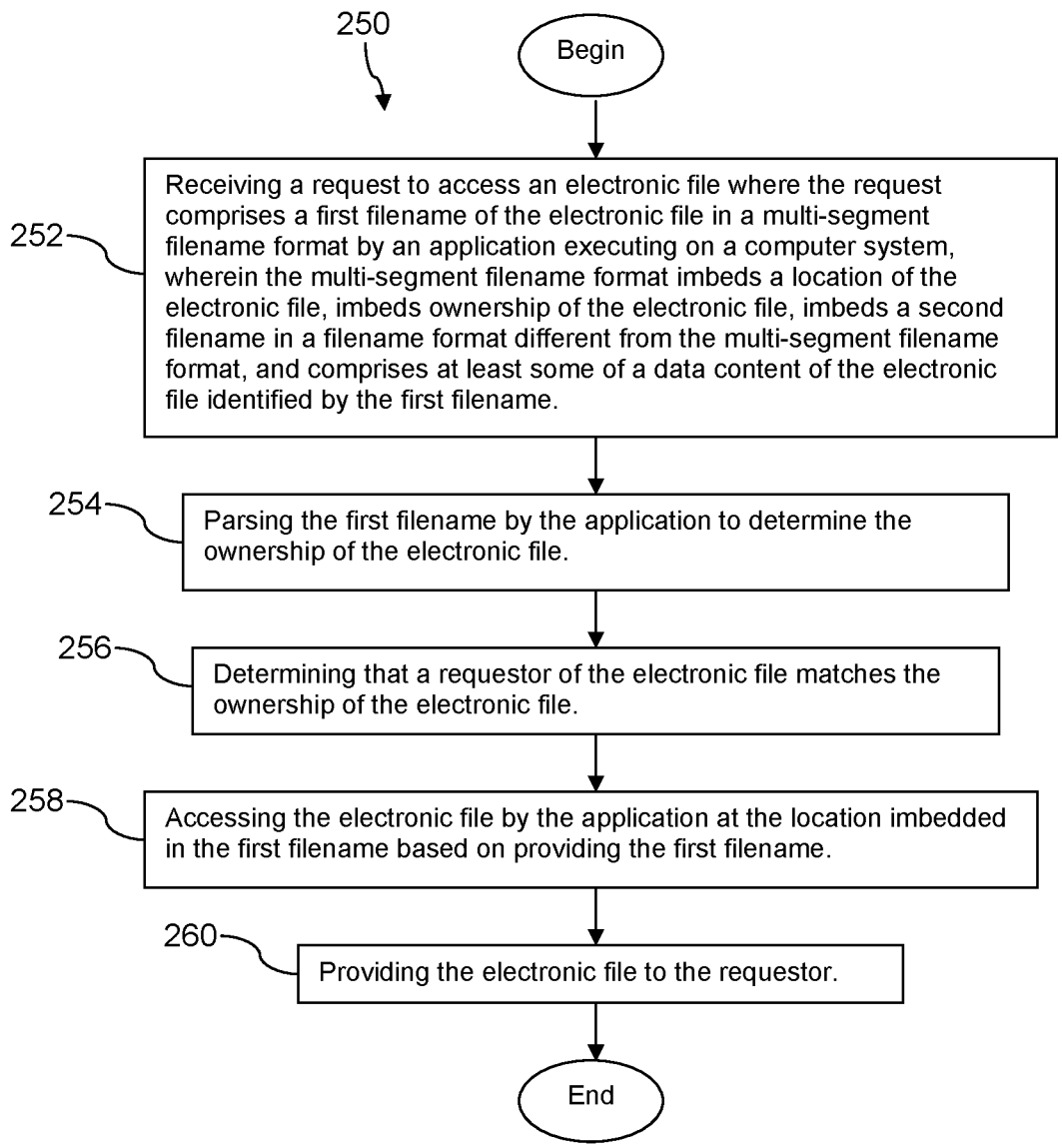
FIG. 5 is a flow chart of yet another method according to an embodiment of the disclosure.

Turning now to FIG. 5, a method 250 is described. In an embodiment, the method 250 comprises a method of executing an electronic file. At block 252, the method 250 comprises receiving a request to access an electronic file where the request comprises a first filename of the electronic file in a multi-segment filename format by an application executing on a computer system, wherein the multi-segment filename format imbeds a location of the electronic file, imbeds ownership of the electronic file, imbeds a second filename in a filename format different from the multi-segment filename format, and comprises at least some of a data content of the electronic file identified by the first filename.

At block 254, the method 250 comprises parsing the first filename by the application to determine the ownership of the electronic file. At block 256, the method 250 comprises determining that a requestor of the electronic file matches the ownership of the electronic file. At block 258, the method 250 comprises accessing the electronic file by the application at the location imbedded in the first filename based on providing the first filename. At block 260, the method 250 comprises providing the electronic file to the requestor.

Figure 6:
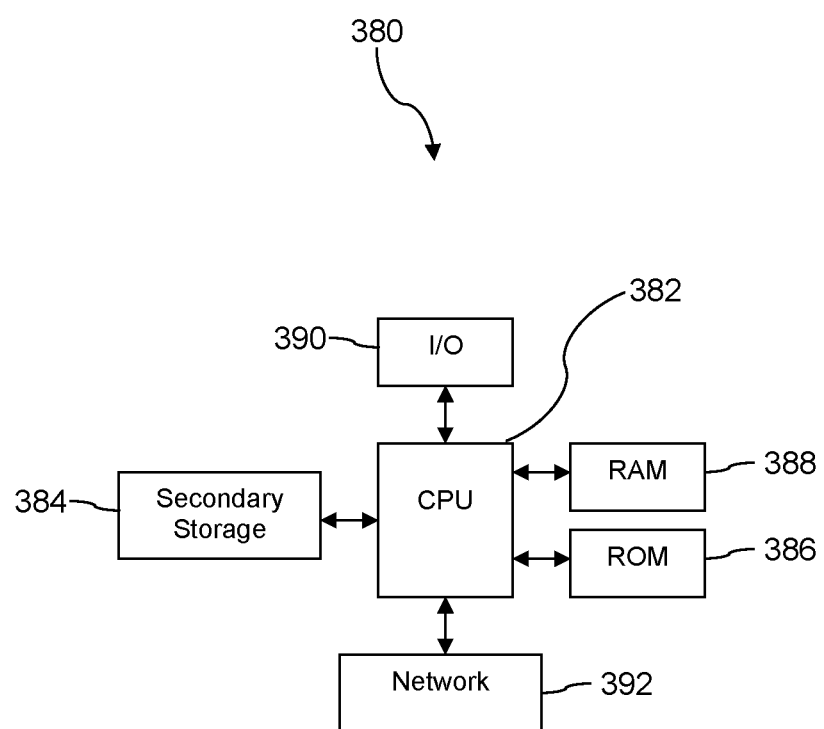
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using the processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, and scripts which it accesses from a hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other devices, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing multi-privilege layer access to confidential information imbedded in filenames of electronic files, comprising:

receiving a multi-segment filename of an electronic file by an application executing on a computer system, wherein the multi-segment filename comprises a unique delimiter between each of the segments of the multi-segment filename and one of the segments of the multi-segment filename comprises a first encrypted data word encrypted with a first encryption key, wherein the electronic file is an executable file, and wherein instructions embedded in the executable file select different execution paths based on different decrypted information from the multi-segment filename used as an input parameter;

generating a first decrypted data word by the application by decrypting the first encrypted data word using the first encryption key, where the first decrypted data word comprises first clear text data and a second encrypted data word encrypted with a second encryption key;

generating a second decrypted data word by the application by decrypting the second encrypted data word from the first decrypted data word using the second encryption key, where the second decrypted data word comprises second clear text data;

providing the first clear text data by the application to a first user having a first access privilege level;

providing the first clear text data and the second clear text data by the application to a second user having a second access privilege level, wherein the second access privilege level is higher than the first access privilege level;

receiving a request to execute the executable file identified by the multi-segment filename along with the first clear text data;

invoking the executable file identified by the multi-segment filename for execution on the computer system while providing the first clear text data as a first execution parameter, wherein invoking the executable file while providing the first clear text data as the first execution parameter comprises selecting, by the instructions embedded in the executable file, a first execution path of the different execution paths based on the first clear text data as the first execution parameter;

receiving a second request to execute the executable file identified by the multi-segment filename along with the second clear text data; and invoking the executable file identified by the multi-segment filename for execution on the computer system while providing the second clear text data as a second execution parameter, wherein invoking the executable file while providing the second clear text data as the second execution parameter comprises selecting, by the instructions embedded in the executable file, a second execution path of the different execution paths based on the second clear text data as the second execution parameter, wherein the first and second execution paths are different.

2. The method of claim 1, wherein the application is an operating system.

3. The method of claim 1, wherein the application is not an operating system.

4. The method of claim 1, wherein the multi-segment filename has at least three segments.

5. The method of claim 1, wherein the second clear text data is personal identifiable information (PII), banking information, or personal medical information.

6. The method of claim 1, wherein the second decrypted data word further comprises a third encrypted data word encrypted with a third encryption key, and further comprising:

generating a third decrypted data word by the application by decrypting the third encrypted data word using the third encryption key, where the third decrypted data word comprises third clear text data, and providing the first clear text data, the second clear text data, and the third clear text by the application to a third user having a third access privilege level, wherein the third access privilege level is higher than the first access privilege level and the second access privilege level.

7. The method of claim 6, receiving a request to execute a file identified by the multi-segment filename along with the third clear text data; and invoking the file identified by the multi-segment filename for execution on the computer system while providing the third clear text data as an execution parameter.

8. A system for managing multi-privilege layer access to confidential information imbedded in filenames of electronic files, comprising:

a non-transitory memory;

a processor; and an application stored in the non-transitory memory that, when executed by the processor:

receives a multi-segment filename of an electronic file, wherein the multi-segment filename comprises a unique delimiter between each of the segments of the multi-segment filename and one of the segments of the multi-segment filename comprises a first encrypted data word encrypted with a first encryption key, wherein the electronic file is an executable file, and wherein instructions embedded in the executable file select different execution paths based on different decrypted information from the multi-segment filename used as an input parameter, generates a first decrypted data word by decrypting the first encrypted data word using the first encryption key, where the first decrypted data word comprises first clear text data and a second encrypted data word encrypted with a second encryption key, generates a second decrypted data word by decrypting the second encrypted data word from the first decrypted data word using the second encryption key, where the second decrypted data word comprises second clear text data, provides the first clear text data to a first user having a first access privilege level, provides the first clear text data and the second clear text data to a second user having a second access privilege level, wherein the second access privilege level is higher than the first access privilege level;

receive a request to execute the executable file identified by the multi-segment filename along with the first clear text data;

invoke the executable file identified by the multi-segment filename for execution on the computer system while providing the first clear text data as a first execution parameter, wherein invoking the executable file while providing the first clear text data as the first execution parameter comprises selecting, by the instructions embedded in the executable file, a first execution path of the different execution paths based on the first clear text data as the first execution parameter;

receive a second request to execute the executable file identified by the multi-segment filename along with the second clear text data; and invoke the executable file identified by the multi-segment filename for execution on the computer system while providing the second clear text data as a second execution parameter, wherein invoking the executable file while providing the second clear text data as the second execution parameter comprises selecting, by the instructions embedded in the executable file, a second execution path of the different execution paths based on the second clear text data as the second execution parameter, wherein the first and second execution paths are different.

9. The system of claim 8, wherein the application is an operating system.

10. The system of claim 8, wherein the application is not an operating system.

11. The system of claim 8, wherein the multi-segment filename has at least three segments.

12. The system of claim 8, wherein the second clear text data is personal identifiable information (PII), banking information, or personal medical information.

13. The system of claim 8, wherein the second decrypted data word further comprises a third encrypted data word encrypted with a third encryption key, and wherein the application further:

generates a third decrypted data word by decrypting the third encrypted data word using the third encryption key, where the third decrypted data word comprises third clear text data, and provides the first clear text data, the second clear text data, and the third clear text to a third user having a third access privilege level, wherein the third access privilege level is higher than the first access privilege level and the second access privilege level.

14. The system of claim 13, wherein the application further:

receives a request to execute a file identified by the multi-segment filename along with the third clear text data; and invokes the file identified by the multi-segment filename for execution on the computer system while providing the third clear text data as an execution parameter.

* * * * *